(12) United States Patent
Chen

(10) Patent No.: US 10,213,840 B2
(45) Date of Patent: Feb. 26, 2019

(54) BLADE FASTENING DEVICE HAVING A WATERPROOF ARRANGEMENT

(71) Applicant: X'POLE PRECISION TOOLS INC., Taoyuan County (TW)

(72) Inventor: Peter Chen, Taoyuan County (TW)

(73) Assignee: X'POLE PRECISION TOOLS INC., Taoyuan County (TW)

( * ) Notice: Subject to any disclaimer, the term of this patent is extended or adjusted under 35 U.S.C. 154(b) by 0 days.

(21) Appl. No.: 14/595,404

(22) Filed: Jan. 13, 2015

(65) Prior Publication Data

US 2016/0199921 A1    Jul. 14, 2016

(51) Int. Cl.
*B23B 31/20* (2006.01)
*B23B 31/02* (2006.01)

(52) U.S. Cl.
CPC .............. *B23B 31/20* (2013.01); *B23B 31/02* (2013.01); *B23B 2231/24* (2013.01); *B23B 2250/12* (2013.01); *B23B 2260/126* (2013.01)

(58) Field of Classification Search
CPC . B23B 31/20; B23B 31/001; B23B 2260/126; B23B 2231/20; B23B 2250/12
See application file for complete search history.

(56) References Cited

U.S. PATENT DOCUMENTS

| | | | | |
|---|---|---|---|---|
| 2,228,684 A * | 1/1941 | Barnum | ................ | B08B 9/0839 134/148 |
| 2,467,569 A * | 4/1949 | Walters | ................ | B23B 31/201 279/50 |
| 2,678,826 A * | 5/1954 | Nick | ................ | B23B 31/20 279/48 |
| 2,809,844 A * | 10/1957 | Tree | ................ | B23B 31/201 279/50 |
| 2,829,899 A * | 4/1958 | Cochran | ................ | B23B 31/202 279/157 |
| 3,215,811 A * | 11/1965 | Kroy | ................ | B23K 11/31 219/120 |
| 3,879,046 A * | 4/1975 | Alford | ................ | B23B 31/208 279/133 |
| 3,905,609 A * | 9/1975 | Sussman | ................ | B23B 31/001 279/157 |
| 4,958,056 A * | 9/1990 | Tomac | ................ | B23K 11/31 219/120 |
| 5,340,127 A * | 8/1994 | Martin | ................ | B23B 31/201 279/157 |
| 5,460,388 A * | 10/1995 | Lewis | ................ | B23B 31/001 279/42 |
| 5,567,093 A * | 10/1996 | Richmond | ............ | B23B 31/001 277/619 |

* cited by examiner

*Primary Examiner* — Daniel Howell
*Assistant Examiner* — Paul M Janeski
(74) *Attorney, Agent, or Firm* — Chun-Ming Shih

(57) ABSTRACT

A blade fastening device is provided with a hollow clamping member including an axial channel for disposing a portion of a blade therein, and at least one slit formed on a peripheral surface so that the hollow clamping member is configured to be flexibly compressible; and a cylindrical extension formed with a first end of the hollow clamping member. The blade fastening device is capable of preventing cutting fluid from leaking, guiding cutting fluid to a cutting site, and fastening a blade so that a deflection of the blade is made impossible.

6 Claims, 4 Drawing Sheets

BLADE FASTENING DEVICE HAVING A WATERPROOF ARRANGEMENT

BACKGROUND OF THE INVENTION

1. Field of the invention

The invention relates to blade fastening devices and more particularly to a blade fastening device capable of preventing cutting fluid from leaking, guiding cutting fluid to a cutting site, and fastening a blade so that a deflection of the blade is made impossible.

2. Description of Related Art

CNC (computer numerical control) lathes are widely employed as technologies advance. The CNC lathes can perform cutting, drilling, etc. on an object. For example, a lathe may be required to cut an object by using one of different blades.

Blade fastening device plays a big role when operating the CNC lathe. Typically, the blade fastening device has an axial channel for pumping cutting fluid to a cutting side. Further, a blade in fastened in a hollow clamping member which is in turn fastened by a sleeve. However, the clamping member may deflect in a cutting operation. Further, the blade may deflect. Furthermore, cutting fluid flowing through an axial channel of the blade may leak through gaps of the clamping member. As a result, a significant amount of cutting fluid is lost and the desired effective clearing of swarf left at the cutting site is compromised. Thus, more cutting fluid is required to achieve the desired clearing of swarf.

Thus, the need for improvement still exists.

SUMMARY OF THE INVENTION

It is therefore one object of the invention to provide a blade fastening device comprising a hollow clamping member including an axial channel for disposing a portion of a blade therein, and at least one slit formed on a peripheral surface so that the hollow clamping member is configured to be flexibly compressible; and a cylindrical extension formed with a first end of the hollow clamping member.

Preferably, each of the at least one slit is elongated.

Preferably, the first end of the hollow clamping member is a rear and a second end thereof is a front end.

Preferably, the extension is formed with the rear end of the hollow clamping member.

Preferably, the extension includes a first sealing ring disposed on an inner surface, and a second sealing ring disposed on an outer surface.

It is envisaged by the invention that the blade fastening device capable of preventing cutting fluid from leaking, guiding cutting fluid to a cutting site, and fastening a blade so that a deflection of the blade is made impossible.

BRIEF DESCRIPTION OF THE DRAWINGS

The invention, as well as its many advantages, may be further understood by the following detailed description and drawings in which.

DETAILED DESCRIPTION OF THE INVENTION

Figure 1:
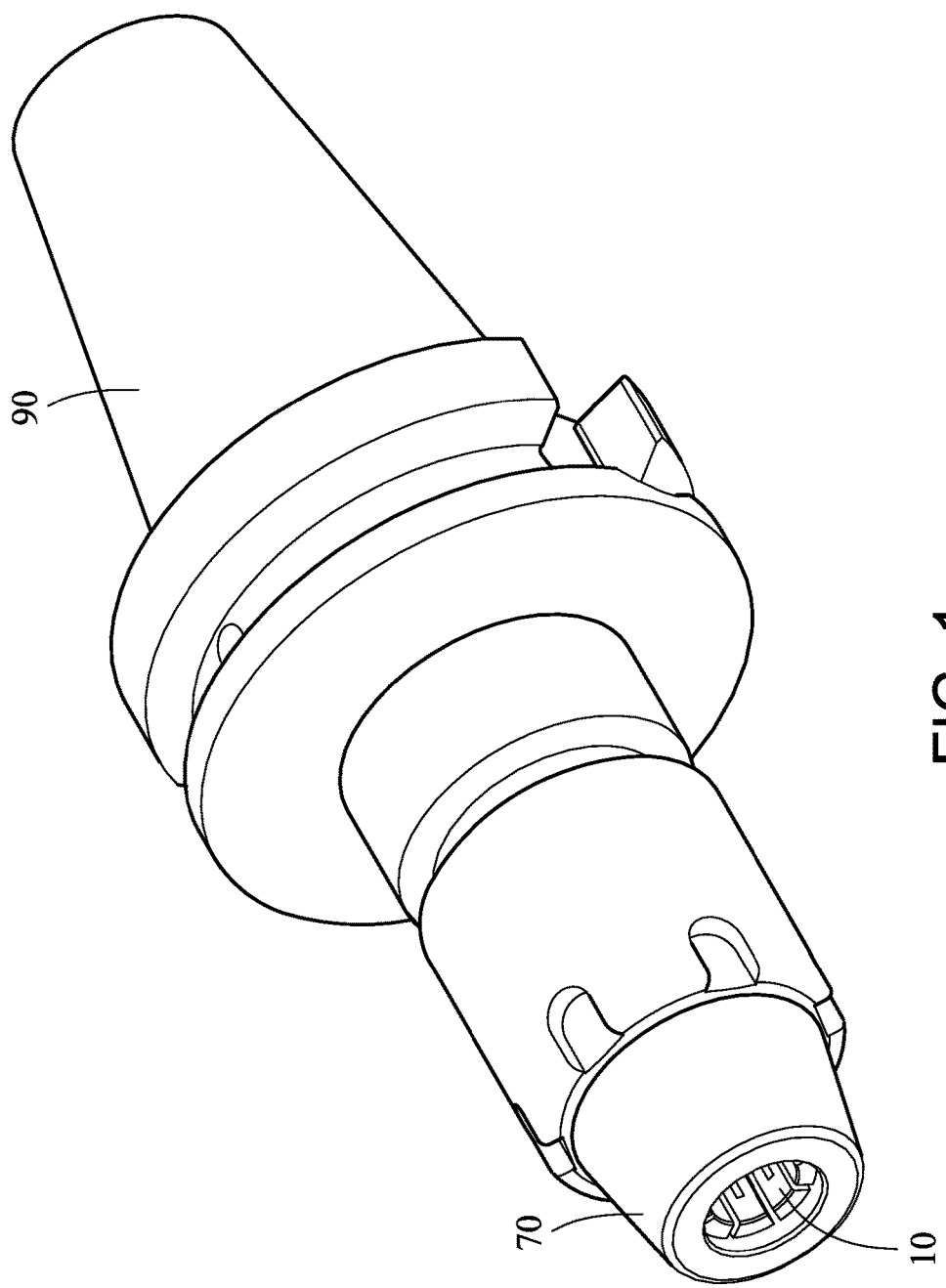
FIG. 1 is a perspective view of a blade fastening device according to a first preferred embodiment of the invention.
Figure 2:
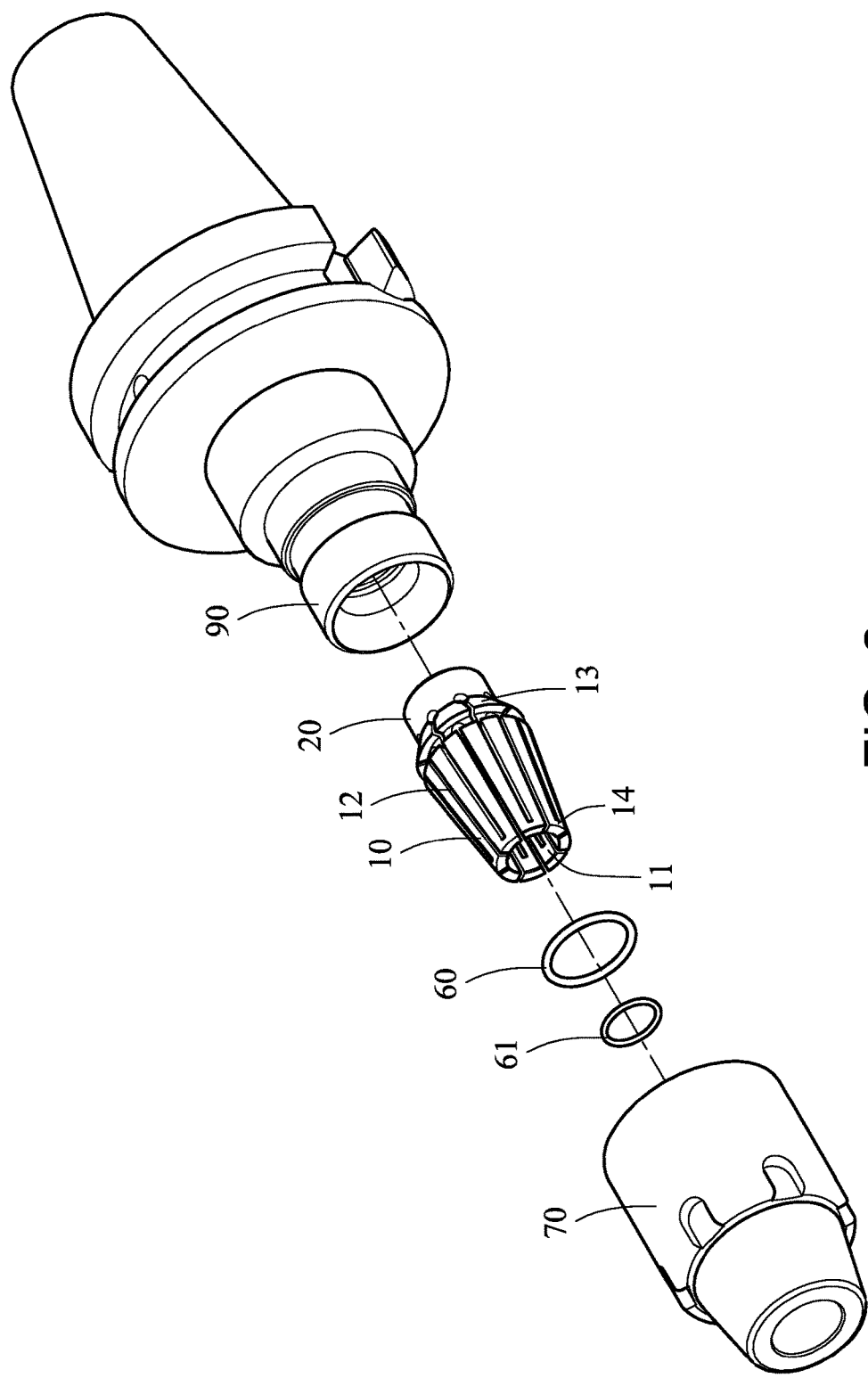
FIG. 2 is an exploded view of the blade fastening device.
Figure 3:
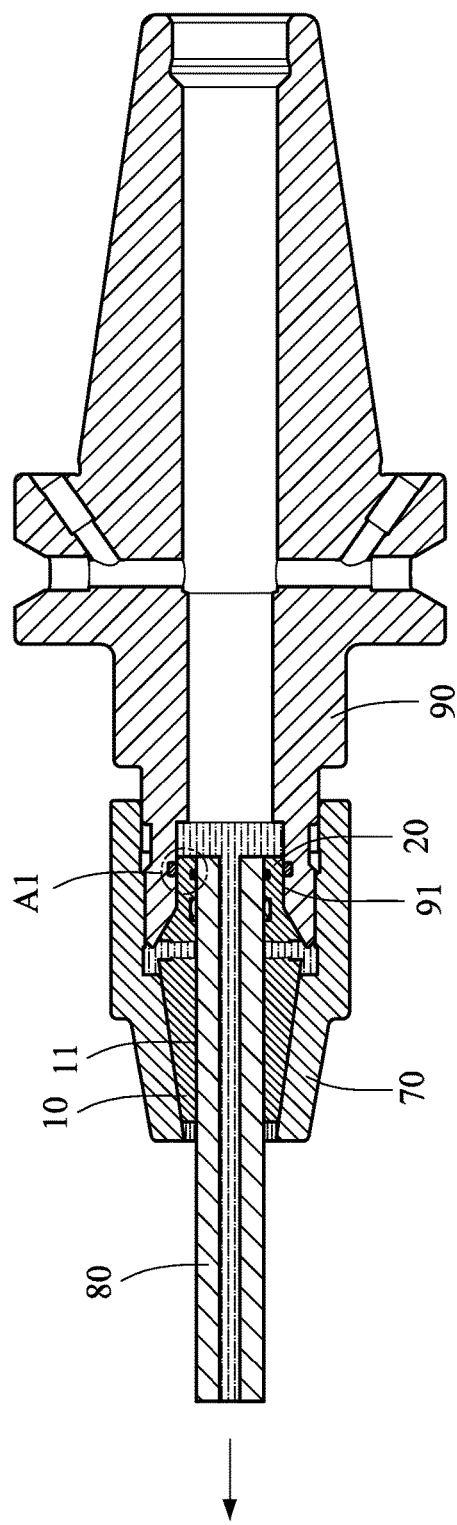
FIG. 3 is a longitudinal sectional view of the blade fastening device with a blade secured thereto.
Figure 3A:
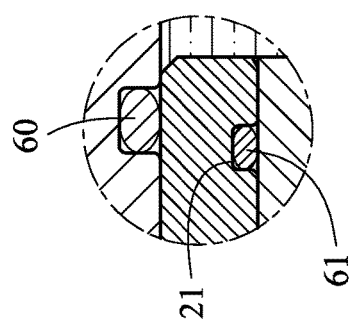
FIG. 3A is an enlarged view of a circle A1 in FIG. 3.

Referring to FIGS. 1 to 3A, a blade fastening device in accordance with a first preferred embodiment of the invention and a hollow blade seat 90 are put together. Further, the blade seat 90 and a blade 80 are secured thereto. The blade fastening device is fastened by mounting a sleeve 70 onto a front portion of the blade seat 90. The blade fastening device comprises the following components as discussed in detail below.

A hollow clamping member 10 includes an axial channel 11 with a portion of the blade 80 disposed therein, and a plurality of elongated slits 12 formed on a peripheral surface so that the clamping member 10 is flexibly compressible. In the assembled state, the clamping member 10 is compressed by the sleeve 70 to fasten the blade 80. The clamping member 10 further includes a tapered rear end 13 and a front end 14 which is configured to insert into the sleeve 70.

A cylindrical extension 20 is integrally formed with the rear end 13. The extension 20 is disposed in a front portion of an axial tunnel 91 of the blade seat 90. A first sealing ring 60 is put on the extension 20 and is compressed by the tunnel 91 so that a watertight arrangement is provided between the extension 20 and the blade seat 90. A second sealing ring 61 is put on the blade 80. The second sealing ring 61 is disposed in an annular groove 21 on an inner surface of the extension 20 and is compressed by the groove 21 so that a watertight arrangement is provided between the blade 80 and the extension 20.

Figure 4:
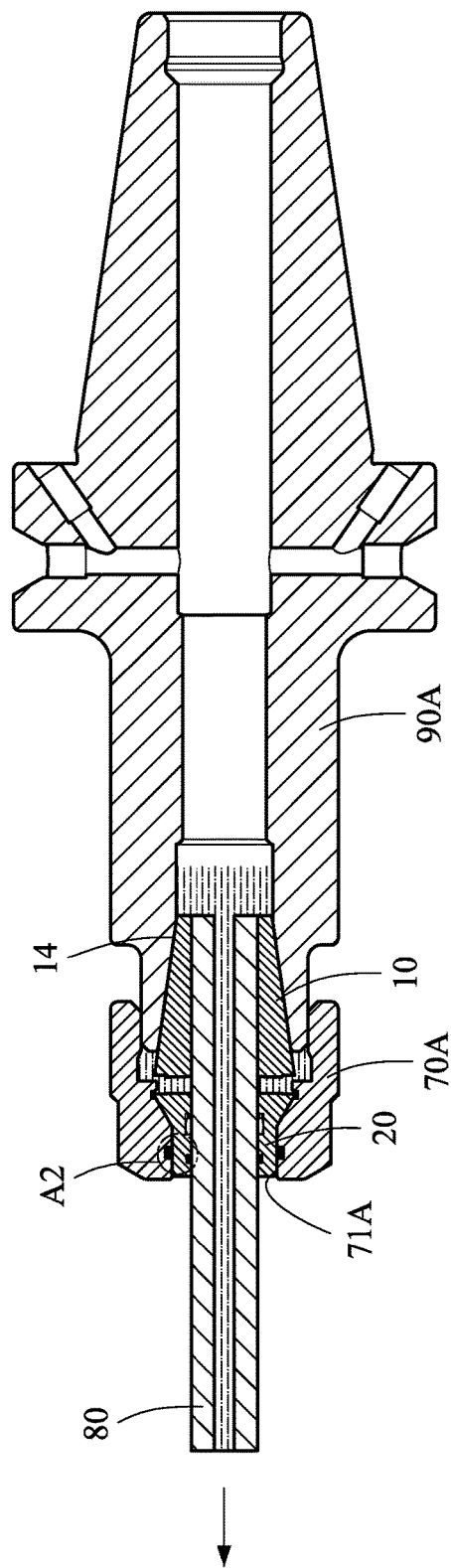
FIG. 4 is a longitudinal sectional view of a blade fastening device according to a second preferred embodiment of the invention.
Figure 4A:
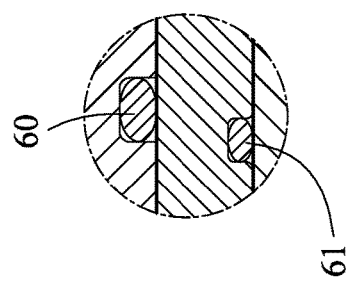
FIG. 4A is an enlarged view of a circle A2 in FIG. 4.

Referring to FIGS. 4 and 4A, a blade fastening device in accordance with a second preferred embodiment of the invention is shown. The characteristics of the second preferred embodiment are described in detail below.

The front end 14 of the clamping member 10 is fastened in the front portion of a blade seat 90A. The extension 20 is fastened in an axial passage 71A of a sleeve 70A. A first sealing ring 60 is put on the extension 20 and is compressed by the passage 71A so that a watertight arrangement is provided between the extension 20 and the sleeve 70A. A second sealing ring 61 is put on the blade 80. The second sealing ring 61 is compressed by the extension 20 so that a watertight arrangement is provided between the blade 80 and the extension 20.

The sleeve 70A and the clamping member 10 are secured together without the provision of a disc member. Further, the provision of the extension 20 to the clamping member 10 not only provides a waterproof arrangement to prevent cutting fluid from leaking but also decreasing blade replacement in a cutting operation.

It is envisaged by the invention that the blade fastening device allows the blade 80 to fasten in the blade seat 90 or 90A, and provides a waterproof arrangement to prevent cutting fluid from leaking in a cutting operation.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A blade fastening device comprising:
   a hollow clamping member including an axial channel for disposing a portion of a blade therein, and at least one slit formed on a peripheral surface thereof so that the hollow clamping member is configured to be flexibly compressible;

a cylindrical extension protruding from a first end of the hollow clamping member; and a blade seat, a front portion of the blade seat accommodating the cylindrical extension, and a groove being formed on an inner surface of the front portion of the blade seat, wherein a first sealing ring is disposed inside the groove and is against an outer surface of the cylindrical extension, and a second sealing ring is disposed against an inner surface of the cylindrical extension, such that the cylindrical extension is sandwiched between the first sealing ring and the second sealing ring, and the first sealing ring is not in direct contact with the second sealing ring;

wherein a sleeve covers the cylindrical extension and only a part of the blade seat, and the sleeve extends toward the blade seat and beyond the groove of the blade seat;

wherein the sleeve and the front portion of the blade seat are not engaged by means of screwing; and wherein a cross section of the first sealing ring is larger than that of the second sealing ring, and the cross sections of the first sealing ring and the second sealing ring are both in oval shape.

2. The blade fastening device of claim 1, wherein each of the at least one slit is elongated.

3. The blade fastening device of claim 1, wherein the first end of the hollow clamping member is a rear and a second end thereof is a front end.

4. The blade fastening device of claim 3, wherein the extension is formed with the rear end of the hollow clamping member.

5. The blade fastening device of claim 1, wherein a base of the blade is against the cylindrical extension, and the blade extends out of the blade fastening device from the hollow clamping member.

6. The blade fastening device of claim 1, wherein a base of the blade is against the hollow clamping member, and the blade extends out of the blade fastening device from the cylindrical extension.

* * * * *